United States Patent [19]

Turner

[11] Patent Number: 5,713,702
[45] Date of Patent: Feb. 3, 1998

[54] ADAPTORS FOR A DRILL STAND

[76] Inventor: Gordon Henry Turner, 15, Aylesham Way, Yateley, Camberley, Surrey GU17 7NR, United Kingdom

[21] Appl. No.: 421,630

[22] Filed: Apr. 13, 1995

[51] Int. Cl.⁶ .................................................. B23B 45/14
[52] U.S. Cl. .................... 408/88; 408/91; 408/100; 408/108; 408/111; 408/109; 408/712
[58] Field of Search ................ 408/95, 99–101, 408/110–112, 712, 87, 88, 91, 97, 98, 103, 109, 136, 234, 135

[56] References Cited

U.S. PATENT DOCUMENTS

| | | | |
|---|---|---|---|
| 690,669 | 1/1902 | Steckenreiter | 408/95 |
| 834,605 | 10/1906 | Cahill | 408/103 |
| 998,660 | 7/1911 | Vichek | 408/95 |
| 1,279,153 | 9/1918 | Peterson | 408/95 |
| 2,468,358 | 4/1949 | Clark | 408/712 |
| 2,973,673 | 3/1961 | Grau | 408/712 |
| 3,667,855 | 6/1972 | Douglass et al. | 408/135 |
| 5,051,044 | 9/1991 | Allen | 408/135 |

FOREIGN PATENT DOCUMENTS

| | | | |
|---|---|---|---|
| 6-155124 | 6/1994 | Japan | 408/109 |
| 1029930 | 5/1966 | United Kingdom . | |
| 1582470 | 1/1981 | United Kingdom . | |
| 2176138 | 12/1986 | United Kingdom . | |
| 2211447 | 7/1989 | United Kingdom . | |

*Primary Examiner*—Steven C. Bishop
*Attorney, Agent, or Firm*—Gunn, Lee & Miller, P.C.

[57] ABSTRACT

An adaptor mounting a drill stand on an I-beam comprises a base plate which is clamped to a flange of the beam by clamping arrangements. A table of the drill stand is then bolted to cross-members slidably mounted on the base plate. In another arrangement, the pillar of the drill stand 11 is fitted in a collar housing which is slidably mounted on a base plate. In yet another arrangement, the pillar of the drill stand is mounted on the flange of an I-beam by opposed jaws which are slidable along the pillar and locked in position by screws.

8 Claims, 4 Drawing Sheets

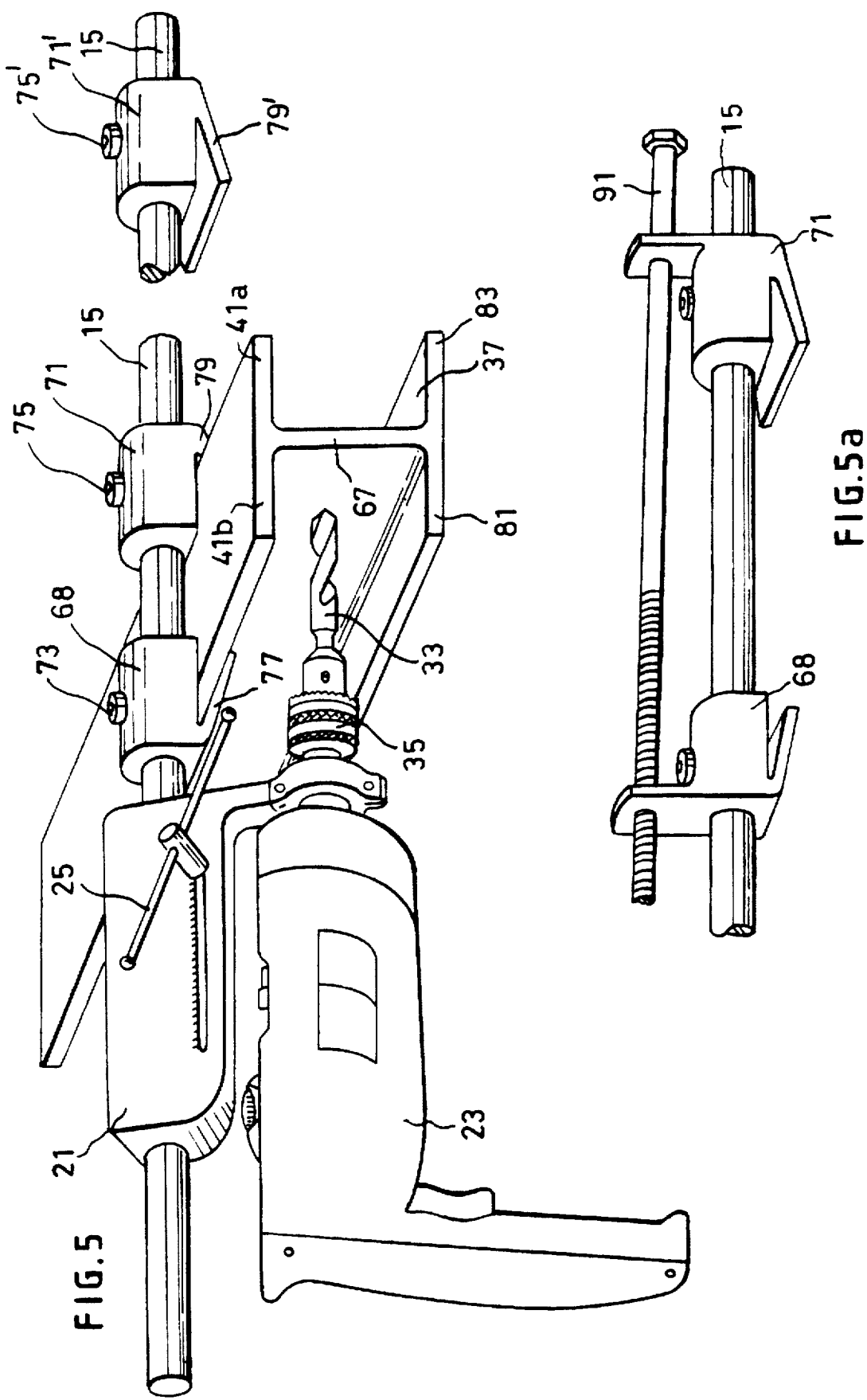

ADAPTORS FOR A DRILL STAND

The present invention relates to adaptors for a drill stand and to a drill stand incorporating the adaptors.

A first aspect of the invention provides an adaptor for a drill stand, the drill stand comprising a pillar and a slide mounted on the pillar for carrying a drill, the adaptor comprising a base plate, means for attaching the base plate to a support such as an I-beam, joist or column, and means for mounting the pillar on the base plate.

A second aspect of the invention provides a mount for mounting a drill on a joist, beam or column, comprising a pillar, a carriage slidably mounted on the pillar and adapted to carry a drill for movement along the pillar under the action of a lever, and means for clamping the pillar to the joist, beam or column.

A particular feature of my invention is that a drill stand can be physically clamped to a metal or plastic joist, beam or column of various dimensions and to enable multiple holes to be drilled through the central web at pre-set distances from the face of the flange, or through the flange at pre-set distances from the edge of the flange, without the need of an electro magnetic device to hold the drill stand in position. The advantages of my method of drilling multiple holes in the horizontal or vertical plane are:

holes can be drilled through non-magnetic materials such as stainless steel and the new experimental "super plastic" structures that are at present being erected in Scotland;

holes can be drilled in sensitive surroundings such as radar installations, computer factories etc. where electro-magnetic or magnetic apparatus is not acceptable;

uneven surfaces sometimes found on metal have no detrimental effect on my clamping method, whereas it may cause difficulty with a magnetic drill stand;

no safety chain is required with my clamping method, as is required with magnetic drill stands; and with my clamping method the drill stand would not become detached in the event of a power failure, as would be the case with an electro-magnetic drill stand.

My invention enables multiple holes to be drilled at pre-set positions relative to the edges of flanges of metal or plastic joists beams or columns or through the central web at pre-determined distances from the face of the flange, whereas a magnetic drill stand has to be positioned for each and every hole, individually.

The present invention provides a method of clamping a drill stand to metal or plastic joists, beams or columns in such a way that the drill stand can operate in the horizontal or vertical plane, or even upside down, when holes can be drilled in overhead applications. It can also be used as a portable drill stand for on-site work by being clamped to any convenient joist, beam or column.

To enable the drill stand to operate in the vertical plane, an adaptor in the form of a base-plate is attached to a metal or plastic joist, beam or column, and a means of attaching a drill stand to the base-plate is provided. The drill stand can be adjustably mounted on the base-plate for movement relative to the base-plate while being lockable in a required position.

Preferably the means for attaching the base-plate to the joist, beam or column is partially releasable to allow the adaptor to slide along the joist, beam or column. This is particularly useful when drilling a number of holes in line at intervals.

Preferably the drill stand is of standard type, comprising a table and a pillar extending upward from the table. An electric drill is attached by a clamp to a bracket that slides about the pillar towards and away from the table.

To enable the drill stand to operate in the horizontal plane, the table is withdrawn from the pillar by loosening the pillar housing bolt or screw. Two adaptors with angled fingers are fitted onto the end of the pillar with the fingers facing inwards towards each other, and when in the correct position with the tapered part of each finger enclosing each flange of the joist, beam or column, the lockscrews are then tightened to hold the adaptors in place on the pillar, thus holding the drill stand securely in position and ready for drilling to commence.

Other preferred features of the invention are shown in the following description.

The invention will be further described by way of example with reference to the accompanying drawings, in which:

FIGS. 5 and 5a show yet another adaptor forming an embodiment of the invention.

Figure 1:
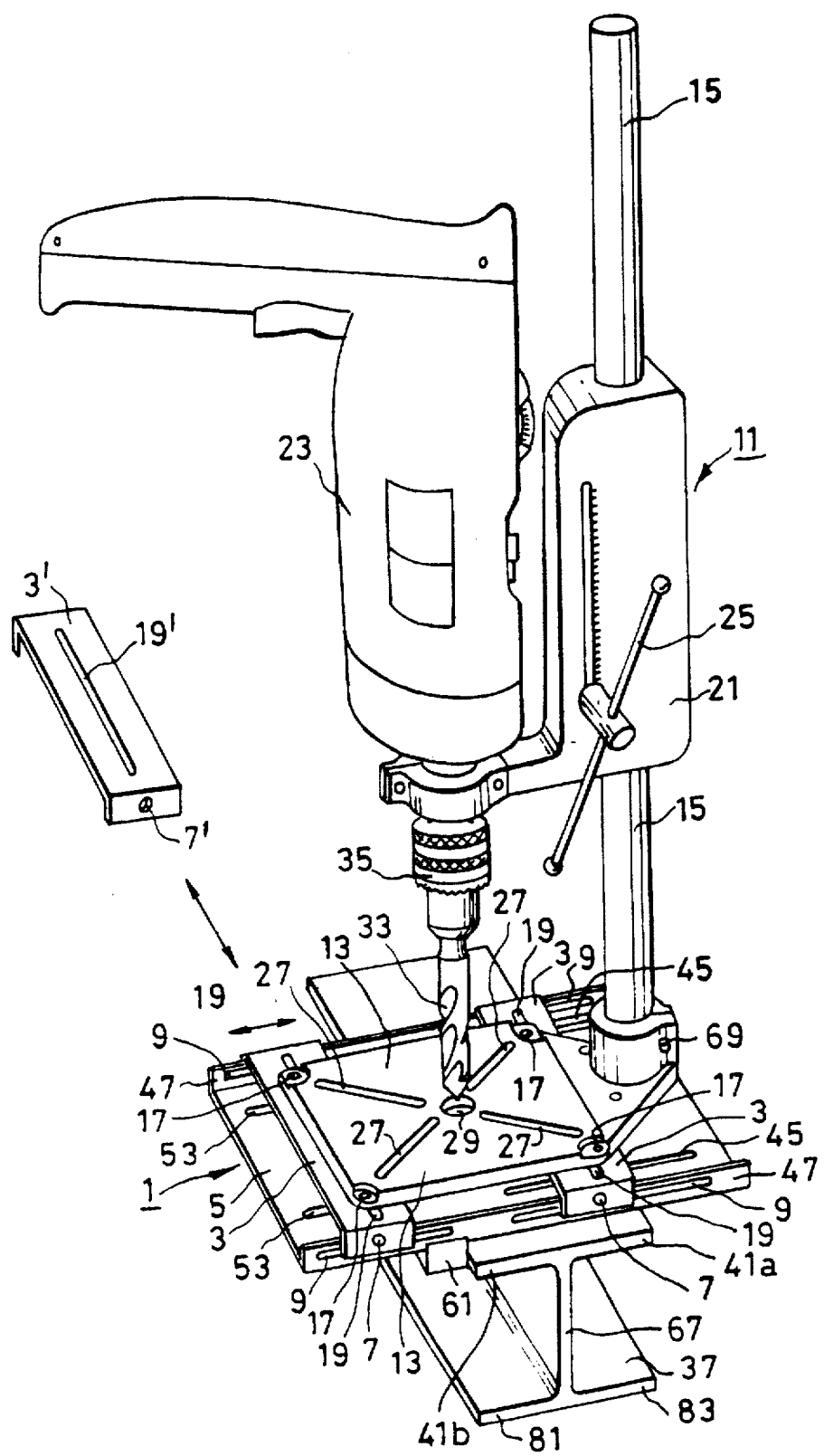
FIG. 1 is a perspective view of an adaptor forming one embodiment of the invention, shown in use for mounting a drill stand and electric drill on a metal or plastic joist, beam or column.

FIG. 1 shows an adaptor 1 forming one embodiment of the invention. The adaptor comprises two support cross-members 3, of which one is shown separated at 3' for clarity, and a base-plate comprises a generally flat plate which rests on the flange 41 of an I-beam 37, and side flanges 47. These support cross-members 3 are attached to the adaptor base-plate 5 by bolts (not shown) which pass through holes 7 in side flanges of the cross-members 3 and slots 9 in the side flanges 47 of he base-plate 5. One hole 7 is shown as 7' in the separated view. Two of the holes 7 at the reverse end of support cross-members 3 are obscured by other parts of the drawing.

A standard-type drill stand 11, comprising a table 13 and an upright pillar 15 is mounted on the two support cross-members 3 and attached by bolts (not shown) which pass through holes 17 in the table 13 and slots 19 in the cross-members 3. The pillar 15 carries a slide 21 which supports an electric drill 23 for movement of the electric drill 23 along the pillar 15 and relative to the table 13 upon the action of the handle 25, as is well known. One slot 19 is shown separated at 19' for clarity. Alternatively, the table 13 of the drill stand 11 could be attached to the support cross-members 3 by means of bolts (not shown) through slots 27 in the table 13 if preferred.

To position the drill 23, chuck 35 of the drill 23 is positioned coaxially with a hole 31 in base-plate 5 (see FIG. 2) by inserting a drill bit 33 or short rod held in the drill-chuck 35 through a hole 29 in the table 13. Generally there will be substantial clearance between the drill bit 13 and the walls of the apertures 29, 31. For increased accuracy of positioning, a drilling bush (not shown) having an internal diameter the same size as the outer diameter of the drill bit 33, and an outside diameter the same size as the hole 31 in the base-plate 5 (FIG. 2) can be used to take up the clearance. After positioning the drill 23, the bolts (not shown) in slots 9 and 19 are then tightened, ensuring that chuck 35 is concentric with the hole 31 in the base-plate 5. Drilling bushes which fit into the aperture 31 of the base-plate 5 and match the drill bit 33 to be used for drilling into the flange 41 can be used as a means of ensuring that drill bit 33 is always maintained in a precise position for accurate drilling and is not deflected by the force on the drill 23 during drilling.

The slots 9 in the side flanges 47 of the base-plate 5, and the slots 19 in the support cross-members 3 ensure that the drill stand 11 can be adjusted in any direction to ensure that hole 29 in table 13 can be positioned accurately in line with hole 31 in base-plate 5, irrespective of the size of the table 13 or the position of bolt holes 17 or slots 27 in the table 13, and so the adaptor 1 is suited to a wide range of available, standard drill stands.

Figure 2:
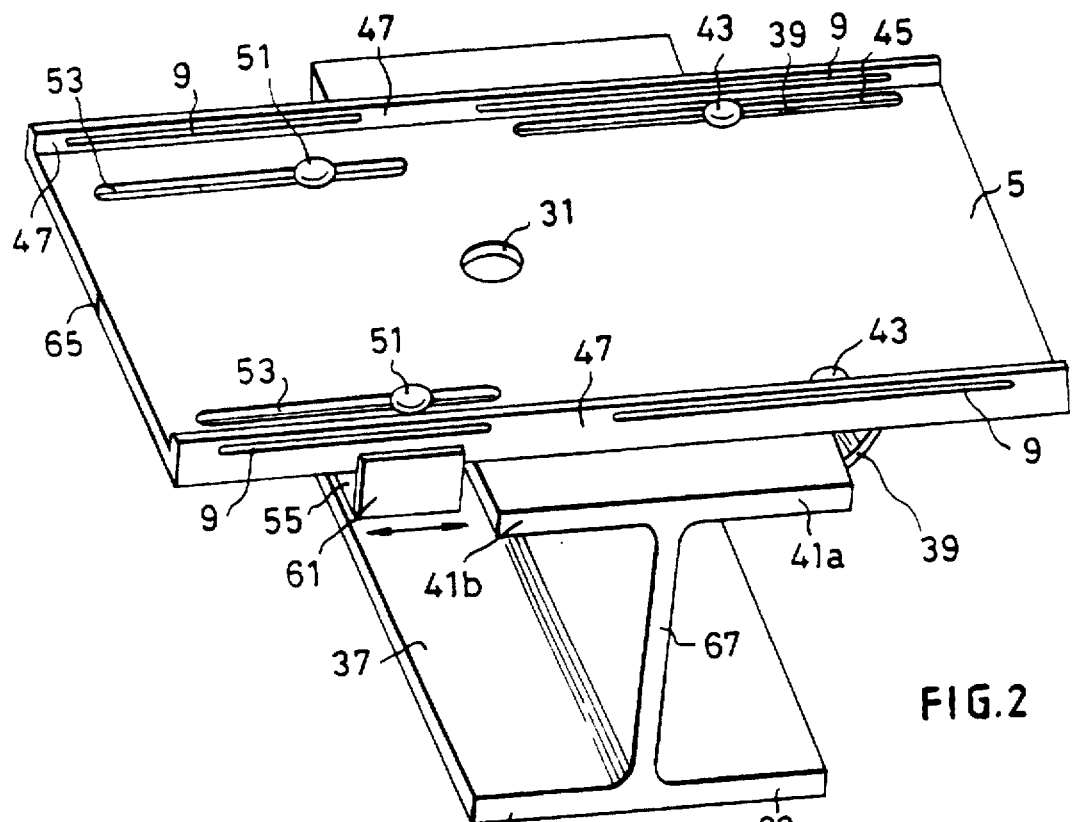
FIG. 2 is a view from above of the adaptor of FIG. 1 mounted upon a joist, beam or column with the two supporting cross members removed for clarity.
Figure 3:
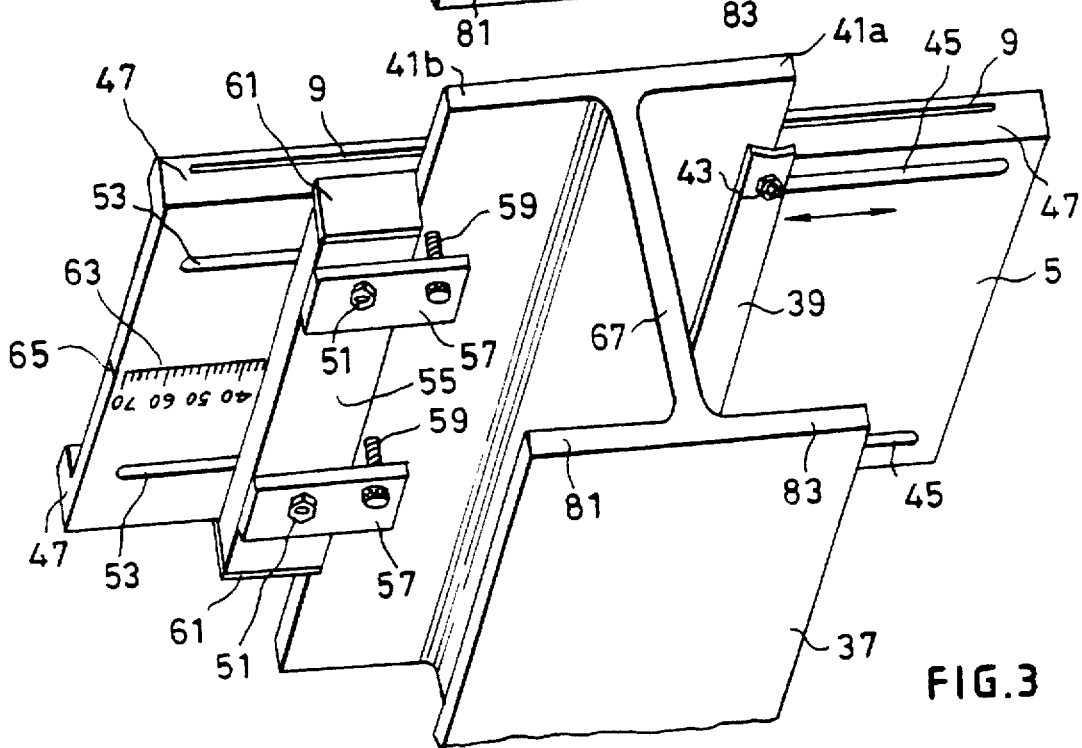
FIG. 3 is an underneath view of the adaptor shown in FIG. 2.

FIGS. 2 and 3 show the arrangement for bolting the base-plate 5 to the joist, beam or column 37.

An arcuate cross-section clamp plate 39 is mounted on the underside of the base plate 5 and grips the underside of one edge 41a of the flange 41 of the joist, beam or column 37. The curved shape of the clamp plate 39 allows it to adjust automatically to the large variation in the thickness of the flanges 41 of many joists, beams and columns. The clamp plate 39 is mounted on the base plate 5 by coach bolts 43 passing through elongate slots 45 in the base plate and slots in the clamp plate 39.

The clamping arrangement for gripping upon the other edge 41b of the flange 41 is a different arrangement. Coach bolts 51 are passed through elongate slots 53 in the base plate 5, a sliding bar 55, and finger plates 57. These finger plates 57 could be welded to sliding bar 55 to maintain the right-angled position relative to the sliding bar 55. The thickness of the sliding bar 55 is a little more than the maximum thickness of any flange 41 of any joist, beam or column 37 to which it is intended that the base-plate 5 shall be clamped. Cap screws 59 are fitted through threaded holes in the finger plates 57. The cap screws 59 are adjusted to bear upon the underside of the flange edge 41b. Thin end plates 61 on the sliding bar 55 engage the side flanges 47 of the base-plate 5 to maintain the correct right-angled alignment of the bar 55 with base-plate 5.

A 1 mm graduated scale 63 is engraved upon the underside of base-plate 5. This scale 63 shows the distance between the face of the sliding bar 55 which abuts the flange edge 41a and the centre of the hole 31 in the base-plate 5 and so enables the hole 31 to be positioned accurately on the flange 41. For lateral positioning of the hole 31, the distance between the centre of the hole and the lateral edge of the base-plate will be a fixed quantity. Additionally, a centre line indentation mark 65 is engraved on the end of base-plate 5.

In use, the required distance of the hole or number of holes to be drilled, as measured from the edge of the flange 41b, is noted and the sliding bar 55 is set to this figure and coach bolts 51 are then tightened. Cap screws 59 are loosened to allow the base-plate 5 and the cap screws 59 to encompass flange edge 41b of the joist, beam or column 37. Curved clamp plate 39 is then slid along slots 45 after the coach bolts 43 have been slackened enough to allow the curved clamp plates 39 to engage upon the underside of flange edge 41a. Coach bolts 43 are then tightened, followed by cap screws 59.

The drill stand 11 is then loosely bolted to the support cross-members 3 and the support cross-members 3 are in turn loosely bolted to the base-plate 5. The drill bit 33 is then lowered by means of pressure upon the handle 25, through the hole 29 in the table 13 into a drill bush (not shown) of the correct size, this bush being located in the hole 31 in base-plate 5.

With the drill bit 33 held in this lowered position and entered into the drill bush (not shown), the bolts are tightened, thus ensuring that drill bit 33 and the hole 29 in the table 13 are concentric with the hole 31 in base-plate 5. Once the sliding bar 55 has been set, any number of holes can be drilled along the joist, beam or column 37, at the preset distance from the edge of the flange 41b, by slackening the coach bolts 43 which hold the curved clamp plate 39 against the underside of flange 41b and the cap screws 59. The whole adaptor 1 can now be slid along the joist, beam or column 37 in a lateral direction to the position required to drill the next hole, after re-tightening cap screws 59 and coach bolts 43, taking care to hold the sliding bar 55 against the edge of flange 49 whilst so doing. If further holes are required in another joist, beam or column 37, even one of different flange thickness and width, but with the holes to be drilled at the same distance from the edge of the flange, then cap screws 59 and coach bolts 43 are slackened to a greater degree to allow the whole adaptor 1 to be removed and re-sited. The setting will always suit the position of further holes as long as coach bolts 51 holding sliding bar 55 in place are not slackened.

An alternative method of assembly is to position the drill stand 11 in position as described above, and secured to support cross-members 3 and base-plate 5, followed by positioning the sliding bar 55 in the chosen position for drilling, before placing about the joist, beam or column 37.

The adaptor 1 allows the portable drill stand 11 to be used as a drill stand per se on site, by clamping the adaptor 1 to any convenient joist, beam or column 37 and using the drill stand 11 in a conventional manner.

Figure 4:
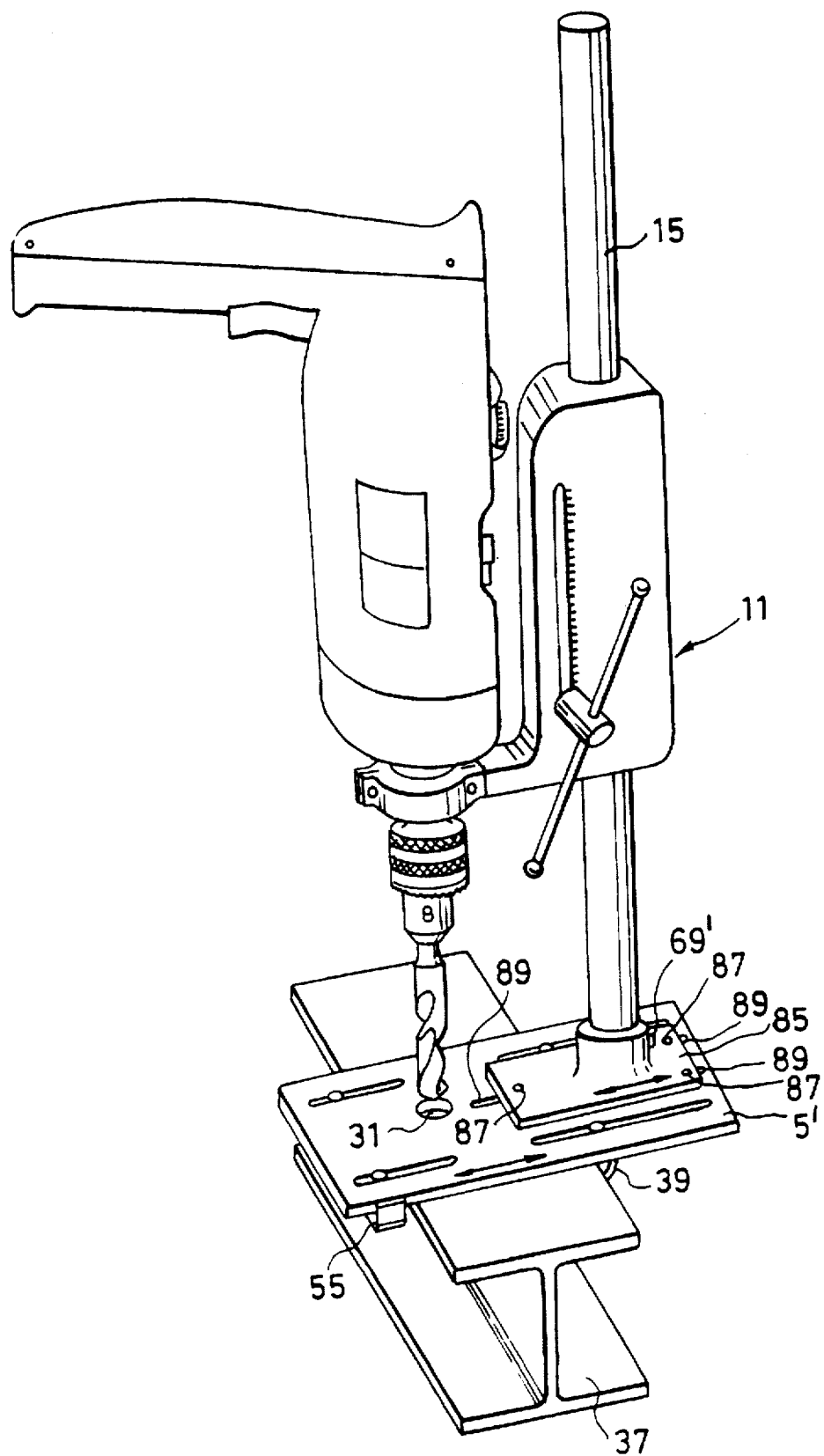
FIG. 4 is a perspective view of a modification of the adaptor of FIG. 1, forming another embodiment of the invention, shown in use for mounting a drill stand and drill on a metal or plastic joist, beam or column.

Another embodiment of the invention is shown in FIG. 4. In the FIG. 4 embodiment, the pillar 15 is mounted in a collar housing 85 provided on a modified base plate 5'. The pillar-housing bolt 69 (FIG. 1) is slackened and the drill-stand pillar 15 is removed from the drill-stand table 13. The modified base-plate 5' is narrower and thus lighter than that of the embodiment of FIGS. 1 to 3 and does not require the slotted flanges 47, or the cross-members 3. The collar housing 85 is adjustable on the base-plate 5'. Once the collar housing 85 has been set to the correct position to match the hole 31 in the base plate 5', the collar housing 85 will not need to be adjusted until or unless a different drill-stand 11 is to be used. The sliding bar 55 is set to the required calibration to suit the required position of the hole or holes to be drilled, and the base-plate 5' can be clamped onto the RSJ, Beam or Column 37, followed by the insertion of the drill-stand pillar 15 into the adjustable collar housing 85 and the tightening of the pillar housing bolt 69'. Split bushes (not shown) can be fitted into the neck of the collar housing 85 to suit the different diameters of the pillars of various models of drill-stand.

With this modification it is not necessary to remove the drill-stand table 13 from the bench to which it is normally bolted, which saves time and trouble for the operator and also reduces the weight of the assembly by a considerable amount.

It will be appreciated that the adaptors of FIGS. 1 and 4 can be used to mount the drill for drilling upwards (i.e. upside down as compared to FIG. 1) or at any other angle depending on the orientation of the flange 41.

Another embodiment of the invention suited to drilling holes through the web 67 of joists, beams or columns 37 will now be described, referring to FIG. 5.

Two adaptors 68 and 71 are placed in position on the pillar 15 and have angled fingers 77 and 79 facing inwards towards each other. In the interest of clarity one adaptor is shown separated at 15', 71', 75', and 79'. The adaptors 68 and 71 are placed in position, enclosing flanges 41a, 41b with the angled fingers 77 and 79, and held firmly as the cap screws 73 and 75 are tightened. The fingers 77, 79 form a birds mouth to readily encompass flanges of different thickness. Most drill stands 11 have an attachment or cap screw (not shown) to allow the sliding part 21 of the drill stand 11 to rotate around the pillar 15 as well as to translate the sliding assembly along the pillar 15. By slackening this cap screw or attachment the position of the drill 23 can be adjusted to any position within the limitations of the arc of any particular drill stand. Some drill stands 11 do not have this facility to rotate the sliding part 21 around the pillar 15, but the same result can be achieved by slightly loosening the cap screws 73 and 75, rotating the pillar 15 and re-tightening when the drill 33 is in the desired position. Using this method the drill 33 can be positioned very close to a wall or other obstruction, if desired.

In use the pressure brought to bear upon the web 67 as the drill 23 is urged towards the web will draw the angled finger 79 very tightly against flange 41a, thus making a safety chain unnecessary.

A split bush (not shown) could be fitted inside adaptors 68 and 71, to prevent bruising of pillar 15 when cap screws 73 and 75 are tightened. Bushes (not shown) could be of various sizes to accommodate different diameters of pillars 15, according to the particular model of drill stand 11 being used.

As shown in FIG. 5a, for heavy industrial use, a long bolt 91 is fitted between adaptors 68 and 71. The bolt is locked axially in the adaptor 71 but turns freely, and engages with a threaded bore on adaptor 68 so that the two adaptors are drawn together by tightening the bolt 91 in the manner of the action of a vice.

I claim:

1. A combination drill stand comprising a pillar and a slide mounted on said pillar for carrying an electric drill, said slide being movable along said pillar under the action of a lever, and an adapter comprising a base plate, means for attaching said base plate to a support, and means for mounting said pillar on said base plate, said means for attaching said base plate adapted to grip an edge of a flange of said support, and markings to position a drill receiving aperture in said base plate at a predetermined distance from said flange edge.

2. The combination of claim 1 wherein said means for attaching said base plate is partially releaseable to allow said base plate to slide along said support.

3. The combination of claim 1 wherein said drill stand comprises a table on which said pillar is mounted, said table being mountable on said base plate.

4. The combination of claim 1 wherein said means for mounting said pillar on said base plate comprises a collar on said base plate which receives said pillar.

5. A combination drill stand comprising a pillar and a slide mounted on said pillar for carrying an electric drill, said slide movable along said pillar under the actions of a lever, and an adapter for mounting said pillar on a support, said adapter comprising a pair of opposed jaws slidable relative to one another along said pillar to grip opposite edges of a flange of said support, means for locking said jaws in position on said pillar, and means for drawing said jaws together to grip said flange, said drawing means comprises a threaded rod, rotation of said rod in one direction urging said jaws toward each other.

6. A combination drill stand and adaptor for mounting the drill stand on an I-beam, the drill stand comprising:

a pillar;

a slide mounted on the pillar and slidable along the pillar under the action of a lever, the slide being adapted to carry an electric drill;

a table having the pillar being mounted on the table; the adaptor further comprising:

a base plate;

means for attaching the table to the base plate; and means for mounting the base plate on a flange of the I-beam, the mounting means further comprising:

opposed jaws mounted on the base plate and slidable towards each other to grip opposed edges of the flange and fixable in position on the base plate.

7. A combination drill stand comprising a pillar and a slide mounted on the pillar for carrying an electric drill, the slide being movable along the pillar under the action of a lever, and an adaptor further comprising:

a base plate;

means for attaching the base plate to a support; means for mounting the pillar on the base plate wherein the means for attaching the base plate is adapted to grip an edge of a flange of the support; and markings provided on the base plate to position a drill receiving aperture in the base plate at a predetermined distance from the flange edge.

8. A combination drill stand comprising a pillar and a slide mounted on said pillar for carrying an electric drill, said slide being movable along said pillar under the action of a lever, and an adaptor comprising a base plate, means for attaching said base plate to a support, means for mounting said pillar on said base plate, said drill stand having a table on which said pillar is mounted, said table being mountable on said base plate.

* * * * *